(12) United States Patent
Gauthier et al.

(10) Patent No.: US 6,645,437 B1
(45) Date of Patent: Nov. 11, 2003

(54) DEVICE FOR INJECTING A HYDROCARBON CHARGE

(75) Inventors: Thierry Gauthier, Brignais (FR); Régis Bonifay, Asnières (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 447 days.

(21) Appl. No.: 08/747,927

(22) Filed: Nov. 12, 1996

(30) Foreign Application Priority Data

Nov. 10, 1995 (FR) .............................. 95 13448

(51) Int. Cl.[7] .................................. B01J 8/18
(52) U.S. Cl. ................... 422/139; 422/140; 422/141; 422/142; 422/143; 422/144; 422/145; 422/146; 422/147
(58) Field of Search ................ 422/140, 143, 422/145, 110, 111, 139, 141, 142, 144, 146, 147; 208/80, 81, 113, 130; 222/145.1, 145.5, 145.6; 239/434, 434.5, 431, 425, 425.5, 423

(56) References Cited

U.S. PATENT DOCUMENTS

| | | | | |
|---|---|---|---|---|
| 2,891,000 A | * | 6/1959 | Metrailer .................... 208/127 |
| 3,654,140 A | * | 4/1972 | Griffel et al. ................ 208/113 |
| 4,021,193 A | * | 5/1977 | Waters .......................... 34/585 |
| 4,097,243 A | * | 6/1978 | Bartholic .................... 422/140 |
| 4,405,444 A |   | 9/1983 | Zandona ..................... 208/113 |
| 4,555,328 A | * | 11/1985 | Krambeck et al. .......... 208/113 |
| 4,640,463 A | * | 2/1987 | Krambeck et al. .......... 239/424 |
| 4,681,743 A | * | 7/1987 | Skraba ........................ 208/157 |
| 4,739,927 A | * | 4/1988 | Hays et al. .................... 239/13 |
| 4,792,436 A | * | 12/1988 | Tsai ............................. 422/111 |
| 4,808,383 A |   | 2/1989 | Buyan et al. ................ 422/140 |
| 4,925,632 A | * | 5/1990 | Thacker et al. ............. 422/142 |
| 5,037,616 A | * | 8/1991 | Williatte et al. ............. 239/398 |
| 5,173,175 A | * | 12/1992 | Steffens et al. ............. 208/153 |

FOREIGN PATENT DOCUMENTS

| | | | |
|---|---|---|---|
| EP | 0151882 | | 8/1985 |
| EP | 0312428 | | 4/1989 |
| EP | 773276 A1 | * | 5/1997 |
| WO | WO 90/11337 | | 10/1990 |

* cited by examiner

Primary Examiner—Jerry D. Johnson
Assistant Examiner—Basia Ridley
(74) Attorney, Agent, or Firm—Antonelli, Terry, Stout & Kraus, LLP

(57) ABSTRACT

The present invention relates to a device for injecting a hydrocarbon charge into a catalytic cracking reactor comprising in particular an envelope (1), a main (liquid) charge feed tube (3), and an inlet (2) for an auxiliary gaseous fluid. According to the invention, charge feed tube (3) is divided, inside envelope (1), into at least two secondary lines (4) designed to distribute said charge uniformly, each secondary line (4) terminates coaxially with the inlet of an element (7) of the venturi type, and the auxiliary gaseous fluid is mixed with the charge at the inlet of said venturi (7). The present invention applies in particular to catalytic cracking of heavy hydrocarbon charges.

14 Claims, 3 Drawing Sheets

DEVICE FOR INJECTING A HYDROCARBON CHARGE

Figure 1:
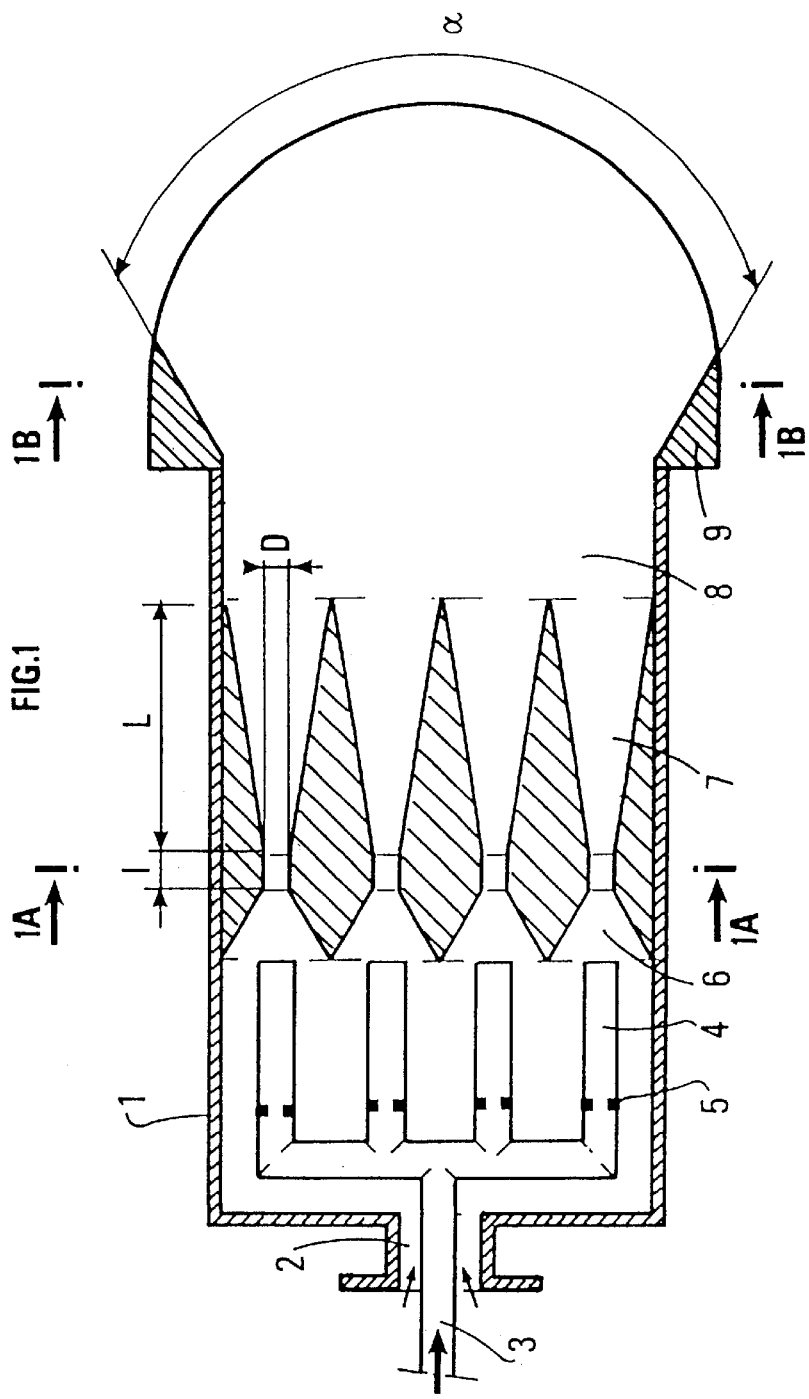

The present invention relates in particular but not exclusively to injection and particularly to injection of a hydrocarbon charge into a fluidized-bed catalytic cracking reactor.

In fluidized-bed catalytic cracking processes known in the field as FCC processes, the hydrocarbon charge is injected into the reactor in the form of a column, in which the catalyst is held in suspension and moves either in an essentially upward flow (the reactor is then called a "riser") or in an essentially downward flow (the reactor is then called a "dropper").

For additional clarity, reference will be made hereinbelow to the case of risers, but the transposition to droppers will be evident to the individual skilled in the art, and the charge injectors subject of the present invention apply of course to both types of reactors.

In a riser, the regenerated catalyst is introduced at the base of the reactor at the same time as a carrier gas, in a hot, fluidized state (between 650 and 850° C.), below the hydrocarbon charge injection zone. This charge is introduced into the reactor in the essentially liquid state and at a temperature generally between 80 and 350° C.

Between the charge injection zone and the top of the reactor, the catalyst yields some of its energy to the charge, which is then vaporized and cracked into light hydrocarbons. This has the effect of rapidly increasing the volume of gases which carry the catalyst in accelerated fashion up to the top of the reactor, where it is separated from the hydrocarbons. The mixture of hydrocarbons and catalyst seeds reaches an equilibrium temperature at the riser outlet which is normally between 470 and 600° C.

During these operations, a small part of the charge (generally between 3 and 12 wt. %) forms a solid hydrocarbon deposit or "coke" on the catalyst particles which reduces the catalytic activity of the catalyst and limits the conversion of the charge into products from which value can be extracted. Hence it is necessary to regenerate the catalyst by burning off this coke deposit before reintroducing it into the reactor for a further cracking cycle.

The size of the coke deposit on the catalyst is generally in proportion to the weight of the injected charge.

Moreover, recent developments in catalytic cracking have shown that important factors in the cracking reaction are the speed and uniformity with which the charge is placed in contact with the catalyst seeds, and hence the quality of atomization and vaporization of this charge when it is injected into the reaction zone.

A number of systems for injecting the hydrocarbon charge into the reaction zone of the catalytic cracking reactor have been described in the prior art.

U.S. Pat. No. 4,097,243 describes for example a charge injection system including a series of tubes disposed at the end of a cone allowing the charge to be distributed over all the moving catalyst seeds. Such a system however has the disadvantage of triggering contact of part of the liquid charge with the reactor walls, leading to excessive, harmful formation of coke.

U.S. Pat. No. 3,812,029 describes a particular injector for obtaining fine particles of charge; however, this injector does not allow good distribution of the droplets, hence poor vaporization of the hydrocarbons and excessive coking. Moreover, when heavy charges are used, this injector often and very rapidly becomes clogged.

Patent application EP-A-220,349 describes a particular injector having a spiral for obtaining droplets with a mean diameter of less than approximately ($35 \times 10^{-5}$ meter) 350 microns while at least partially avoiding contact of the charge with the walls of the reaction zone. However, formation of vortices of charge droplets near these injectors interferes with the flow of the catalyst seeds, causing an increase in the backmixing phenomenon which is detrimental to proper operation of the process.

The usefulness of injecting the charge to be processed into the reactor at high speed and in the form of very fine droplets is well known in the prior art (see U.S. Pat. Nos. 2,891,000 and 2,994,659).

The goal of the present invention is to overcome the drawbacks of the prior art hydrocarbon charge injection process and to obtain, particularly in the case of cracking heavy charges, optimum contact between the hydrocarbons and the catalyst seeds due to homogeneous, instant atomization in the form of fine droplets in the injection zone.

More specifically, the present invention allows smaller droplets to be created than those formed in a single-neck venturi injector with an equivalent passage cross section at the level of the neck and operating under the same conditions.

In other words, the present invention improves the performance of a venturi-type injector by increasing the efficiency of contact between the gas phase and the liquid phase in the injector.

The venturi injector is particularly well suited for injection of hydrocarbons in a catalytic cracking process. It comprises, as a minimum, a mixing chamber into which the hydrocarbon charge and the atomization gas are introduced at low speed, a converging section in which the liquid and gas phases are mixed in a co-current, and a diverging section in which the gas and liquid flow homogeneously, the liquid being atomized into fine droplets. This injector atomizes the hydrocarbons into fine droplets, using a low percentage of vapor.

Moreover, the present invention allows less coke to be formed.

The consumption of vapor, for a given droplet size, is smaller. The associated reduction in operating costs is highly appreciated by users.

Another advantage of the present invention relates to the compactness of the equipment; the comparative data cited below will allow this advantage to be better appreciated.

Thus, the present invention relates to a device for injecting a hydrocarbon charge into a catalytic cracking reactor having in particular an envelope, a main gas feed tube, and an inlet for an auxiliary gaseous fluid.

According to the invention, the charge feed tube is divided, inside the envelope, into at least two secondary lines designed to distribute said charge uniformly, each secondary line terminates upstream of a venturi-type element, and the auxiliary gas fluid is mixed with the charge in a mixing chamber located at the inlet to said venturi.

In particular, the venturi-type elements are disposed parallel to each other inside the envelope.

According to one embodiment of the invention, the inlet for the auxiliary fluid is disposed parallel to at least one of said secondary lines.

The at least one secondary line can be fitted on its inside with a restriction in passage cross section. According to one embodiment of the invention, the venturi-type element has an extension at its converging section.

Advantageously, the envelope can have a mouthpiece having an opening, located downstream of said venturi and designed to direct the mixture of charge and auxiliary fluid to a reaction zone outside the envelope.

The mouthpiece can be arranged to create a flat jet.

More specifically, the walls of the opening of the mouthpiece define an angle α of between approximately 30 and 75°.

According to one feature of the invention, the venturi-type elements have a converging section with an angle of between 10 and 45° and a diverging section with an angle of between 2 and 14°.

According to a first embodiment of the devices according to the invention, each secondary line has at least one orifice which terminates substantially coaxially upstream of the venturi.

According to a second embodiment of the device according to the invention, each secondary line can be blocked at its end and have a plurality of orifices or slots disposed at its periphery and designed to carry the charge transversely to the flow of the secondary fluid. These orifices or slots terminate downstream of the venturi and deliver the charge preferably substantially perpendicularly to the secondary fluid flow.

The device according to the invention can be applied to catalytic cracking of heavy hydrocarbon charges.

Other characteristics, details and advantages of the present invention will emerge more clearly from reading the description hereinbelow, provided for illustration and not limitatively, with reference to the attached figures.

A preferred embodiment of the device according to the invention appears in lengthwise section in FIG. 1 and FIGS. 1A and 1B.

Figure 2:
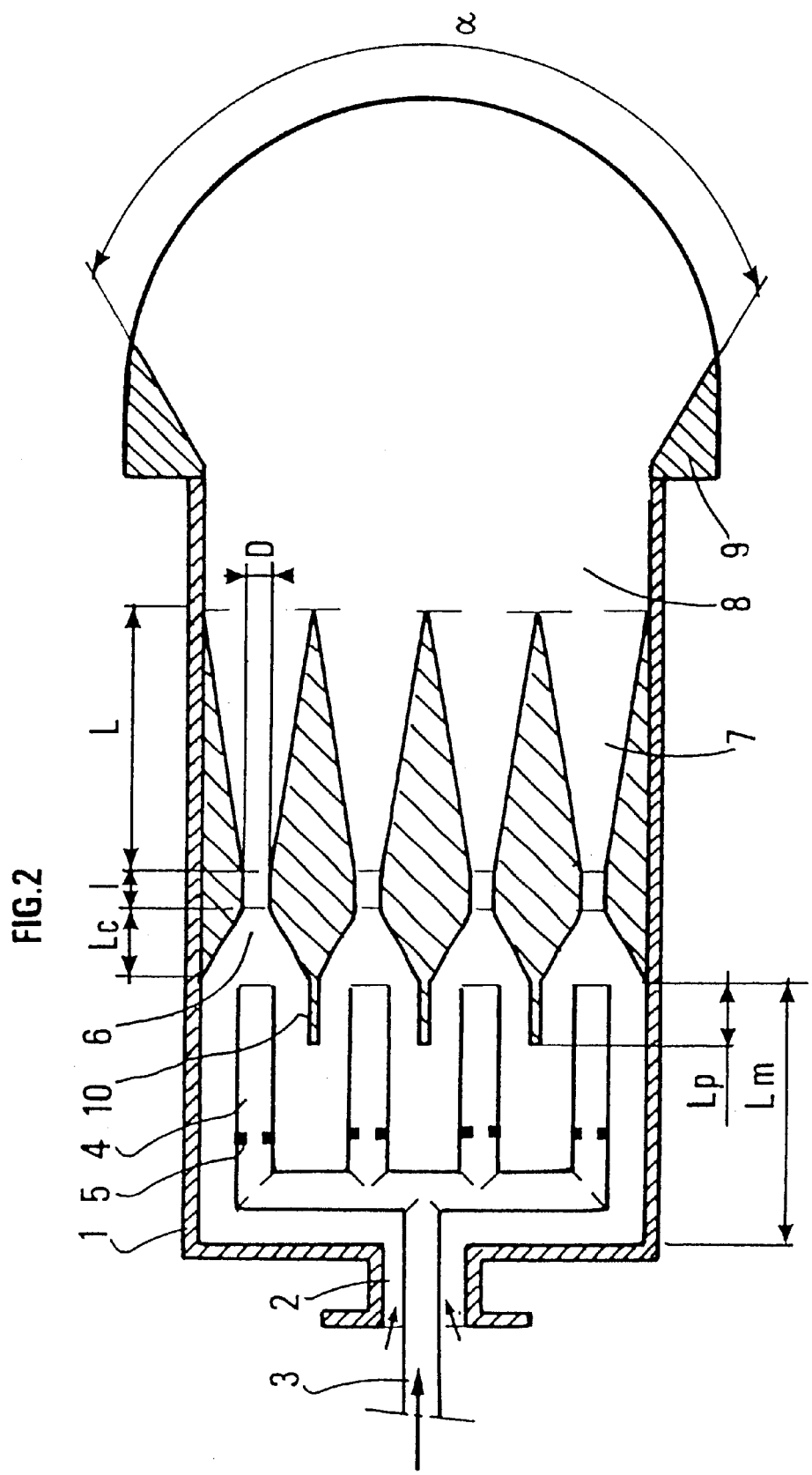
Figure 3:
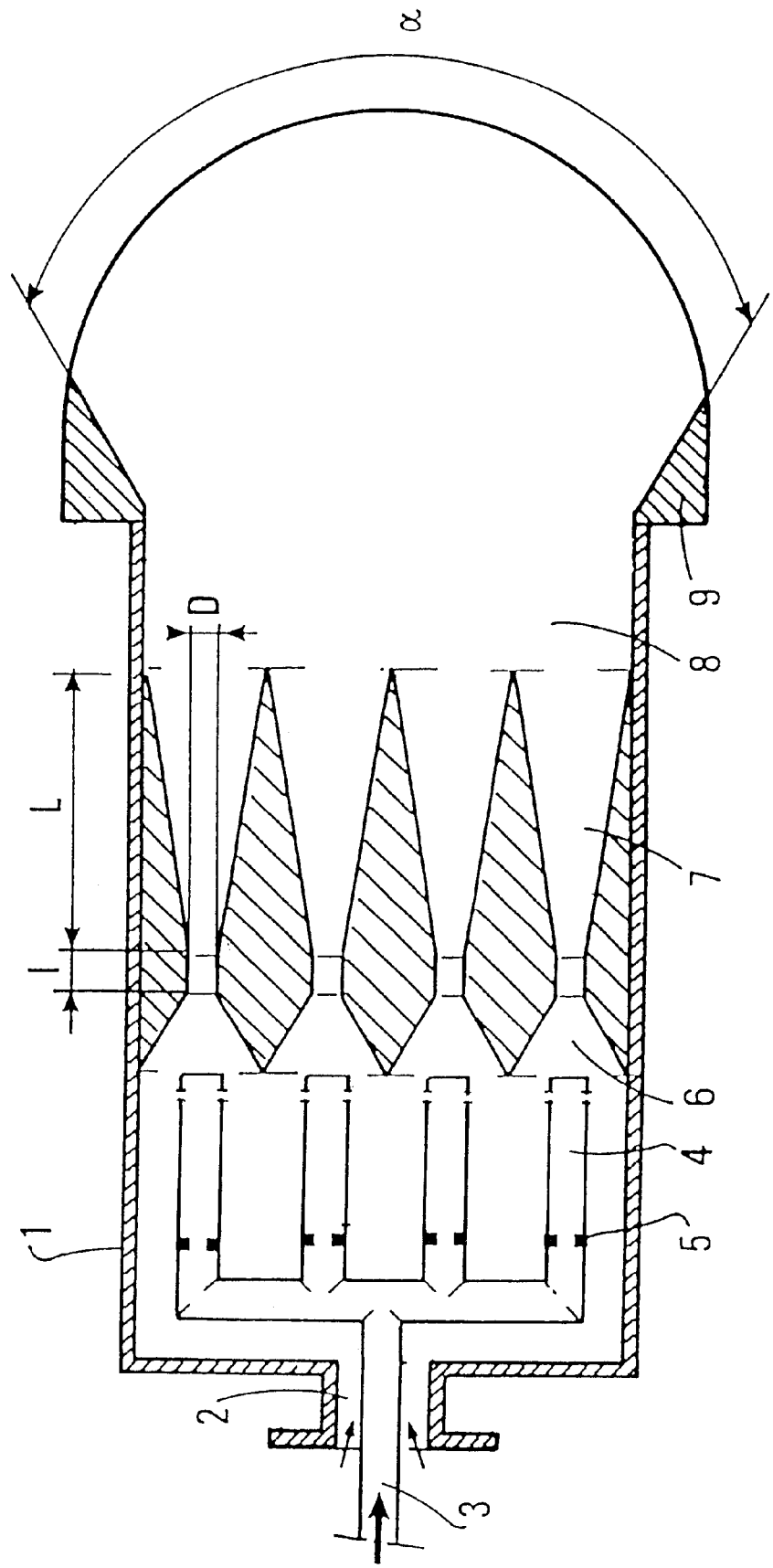

FIG. 2 shows, in lengthwise section, another embodiment of the invention.

According to these figures, an outer envelope 1, of elongate shape, has an opening 2 at one of its ends. A main line 3 passes through opening 2 and divides into n secondary lines 4 inside envelope 1.

Each secondary line 4 is preferably equipped on the inside with a restriction 5 designed to distribute the fluid passing through it uniformly. Moreover, each secondary line 4 terminates coaxially at the inlet 6 of a venturi 7 whose characteristics will be shown in detail below.

The other end, or outlet 8, of venturis 7 terminates near the outlet of envelope 1.

Preferably, the outlet of envelope 1 may have a mouthpiece 9 with a particular shape: mouthpiece 9 has, according to FIG. 1, an opening whose walls define an angle a of between approximately 30 and 75°.

Particularly in the case of an FCC application, the charge to be cracked is introduced via main line 3 while the auxiliary gaseous fluid (generally water vapor or another acceptable gas form) is introduced via opening 2. The charge is divided between the n secondary lines 4, each provided with a restriction 5.

According to the example given by the attached figures, four secondary lines are provided. Realistically, devices with 2 to 10 venturis could be envisaged. Moreover, according to the embodiment of FIG. 1, the axes of these lines belong to the same plane as shown in FIG. 1A. The general shape of the envelope is accordingly flat.

Secondary lines 4 can be blocked at their ends and provided with slots or orifices designed to carry the charge transversely to the secondary fluid flow. The stopper (not shown) of each secondary line can be conical to facilitate the mixing of the two fluids.

The four venturis 7, coaxial with each of four secondary lines 4, thus each have an inlet 6 at which the mixture of charge and auxiliary fluid is formed: the charge arriving from secondary lines 4 and the fluid surrounding secondary lines 4.

The mixture thus formed is hence greatly speeded up at each venturi. This arrangement allows the lines of liquid to be sheared into fine droplets, and hence creates near-instantaneous atomization. Hence the present invention allows a premixture to be created upstream of each venturi; this leads to more intimate contact between the liquid and the gas, by the shearing effect of the liquid arriving with the gas stream.

More specifically, the angle of the converging section of the venturi is between 10 and 45° and the angle of the diverging section is between 2 and 14°. The diameter of each venturi at outlet 8 is calculated such that the exiting flowrate of the suspension is between 20 and 150 m/s, preferably between 50 and 100 m/s.

Each venturi can have a straight zone (neck) between its converging section and its diverging section, although this feature is not compulsory.

The length L of the neck measured on the lengthwise axis of the venturi is preferably between 0 and 5 times its diameter D.

The length l of each diverging section can be defined according to that of a single-neck injector. This is because the length L1 of each of the diverging sections in a single-neck injector with N orifices is less than the length of the diverging section of a single-neck injector L2 whose passage cross section at the neck would correspond to the sum of the passage cross sections at the multi-neck injector neck.

The lenght L1 is less than $$\frac{L2}{\sqrt{N}}.$$

Since length L2 is generally between 0 and 20 times the diameter of the neck, a multi-neck injector composed of four orifices with a total passage cross section equal to the passage cross section of a single-neck injector would have a diverging section length L less than half the length of the diverging section of the corresponding single-neck injector.

The sizes of the venturis will of course depend on the speed and flowrate of the charge and those of the vapor. The temperature at which the charge is introduced can be between 80° and 250° depending on its composition and the process employed.

The total charge flowrate into the reactor is generally less than 10,000 tons/day. On average, the charge flowrates are approximately 5000 tons/day. According to the invention, the charge is divided between several injectors, with the number varying from 1 to 20, preferably from 3 to 12.

The auxiliary gaseous fluid used to favor atomization of the charge in the device according to the invention is usually water vapor or a gaseous fluid relatively rich in hydrogen or in hydrogenated compounds.

For illustration, if water vapor is used, the vapor percentage can be between 1 and 10% of the charge and preferably between 2 and 6%.

At the venturi neck, the flowrate of the mixture is generally between 2000 and 10,000 kg/s/m².

FIG. 2 illustrates an embodiment of the invention that differs from that of FIG. 1 in that venturi-type element 7 has an extension 10 at its converging section 6. Extension 10 thus penetrates into the mixing chamber through secondary lines 4, which contributes to better dividing the mixture.

The length Lp of extension 10 measured along the lengthwise axis is preferably less than half the length Lm of the mixing chamber.

As already stated, a preferred application of the invention relates to catalytic cracking of hydrocarbon charges. The present invention is particularly appropriate for cracking heavy charges characterized in that at least 10 wt. % of the charge has a boiling point of over 500° C. such as for example charges containing at least one fraction coming from the bottom of the atmospheric distillation column, hydrotreated or not.

The ratio between the catalyst and the solid charge depends on the operation and on the total size of the unit. It is generally between 3 and 15 and preferably between 4 and 8.

With Lc being the length of the converging section measured along the lengthwise axis of the injector, the secondary lines 4 can terminate inside, at its maximum section or outside the converging section 6 at a maximum distance of Lc/2 from the largest cross section of converging section 6.

The position and relative orientation of the charge and catalyst injectors can result in co-current or counter-current circulation of the two media in the injection zone where the charge and catalyst are placed in contact. French patent FR 2,585,030 shows a catalytic cracking process and device according to which the charge and catalyst circulate counter-current-wise while French Patent FR 2,644,795 discloses co-current circulation.

The present invention applies to either type of operation.

As an example, the catalytic cracking reactors capable of using injectors according to the invention can have diameters of between 30 cm and 2 m according to the capacity envisaged.

The device according to the invention operates particularly well in reactors in which the catalyst has a seed density of between 1000 kg/m$^3$ and 2000 kg/m$^3$, with a regenerated catalyst temperature of between 600 and 900° C.

The catalysts usable in the process subject of the present invention include cracking catalysts of the crystalline aluminosilicate type and certain silica-alumina, silica-magnesia, or silica-zirconium types, all of which have relatively high cracking activities. The crystalline aluminosilicates can be in the natural state or be prepared by synthesis, according to techniques well known to the individual skilled in the art. They can be chosen from the synthetic zeolites or clays such as faujasite, certain mordenites, montmorillonite, bridged clays, aluminophosphates, or the like.

By way of comparison, with a single-neck injector, two examples are provided hereinbelow. The first (Example I) shows the improvement supplied by the invention in droplet size, while the second example shows the lower consumption of gas according to the invention.

|  | Single-Neck Venturi Injector | Multi-Neck Venturi Injector |
| --- | --- | --- |
| Example 1: Performance Comparison of Two Injectors | | |
| Venturi diam. (mm) | 48 | 24 |
| Number of venturis | 1 | 4 |
| Gas flowrate (kg/s/m$^2$) at neck | 250 | 250 |
| Liquid flowrate (kg/s/m$^2$) at neck | 5000 | 5000 |
| Average drop diameter (Sauter's diameter) | d | 0.85 d |
| Example 2: Gas Consumption Comparison of the Two Injectors | | |
| Venturi diam. (mm) | 48 | 24 |
| Number of venturis | 1 | 4 |
| Gas flowrate (kg/s/m$^2$) at neck | 250 | 175 |
| Liquid flowrate (kg/s/m$^2$) at neck | 5000 | 5000 |
| Average drop diameter (Sauter's diameter) | d | d |

What is claimed is:

1. A device for injecting a hydrocarbon charge into a catalytic cracking reactor comprising an envelope, a main charge feed tube, and an inlet for an auxiliary gaseous fluid, wherein said charge feed tube is divided, inside said envelope, into at least two secondary lines designed to distribute said charge uniformly, wherein each secondary line terminates upstream of a respective venturi element, wherein each secondary line has a plurality of orifices or slots disposed at its periphery and designed to carry the charge transversely to a direction of flow of said auxiliary gaseous fluid, said orifices or slots terminating upstream of the respective venturi element, and wherein, for each secondary line and each respective venturi element, the auxiliary gaseous fluid is mixed with the charge in a mixing chamber located at an inlet of said respective venturi element.

2. The device according to claim 1, wherein each said venturi element is disposed parallel to each other venturi element inside said envelope.

3. The device according to claim 1, wherein said inlet for the auxiliary fluid is disposed parallel to at least one of said secondary lines.

4. The device according to claim 1, wherein at least one of said secondary lines is provided on its inside with a restriction of its passage cross section.

5. The device according to claim 1, wherein each said respective venturi element has an extension at its converging section.

6. The device according to claim 5, wherein said extension has a length Lp, measured on a lengthwise axis of the device, that is less than half a length Lm of the mixing chamber.

7. The device according to claim 1, wherein said envelope has a mouthpiece having an opening, located downstream of each said element, and designed to direct the mixture of charge and auxiliary fluid to a reaction zone outside the envelope.

8. The device according to claim 7, wherein said mouthpiece is arranged to create a flat jet.

9. The device according to claim 7, wherein walls of an opening of said mouthpiece define an angle a between approximately 30 and 75°.

10. The device according to claim 1, wherein each said venturi element has a converging section with an angle of between 10 and 45° and a diverging section with an angle of between 2 and 14°.

11. The device according to claim 1, wherein said device has four secondary lines.

12. The device according to claim 1, wherein the secondary lines have axes that belong to one and the same plane.

13. The device according to claim 1, wherein each secondary line has at least one orifice that terminates upstream of its respective venturi element so that said charge is directed in a direction that is substantially coaxial with said respective venturi element.

14. A method of catalytically cracking heavy hydrocarbon charges comprising the steps of injecting a hydrocarbon charge into a catalytic cracking reactor through the device according to claim 1 and catalytically cracking said hydrocarbon charge in said reactor.

* * * * *